Figure 1:
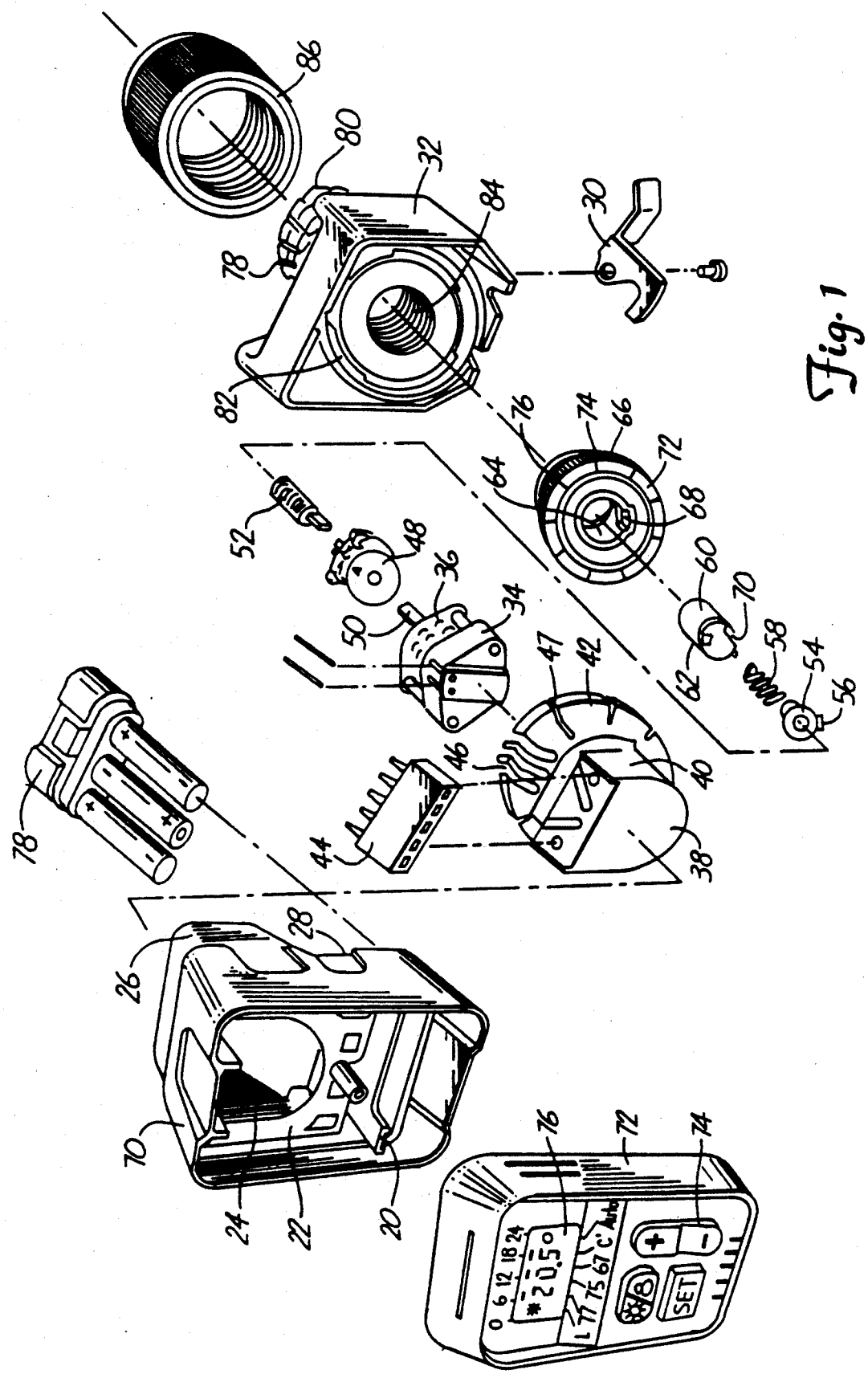

United States Patent [19]
Laur et al.

[11] Patent Number: 5,137,051
[45] Date of Patent: Aug. 11, 1992

[54] CONTROL DEVICE FOR A RADIATOR VALVE

[75] Inventors: Walter Laur; Wolfgang Mueller, both of Schoenaich; Rolf Sauer, Steinenbronn; Gerhard Schneider, Weil der Stadt; Manfred Ulmer, Schoenaich, all of Fed. Rep. of Germany

[73] Assignee: Centra-Buerkle GmbH, Schoenaich, Fed. Rep. of Germany

[21] Appl. No.: 350,473

[22] PCT Filed: Dec. 7, 1987

[86] PCT No.: PCT/EP87/00760
§ 371 Date: May 8, 1989
§ 102(e) Date: May 8, 1989

[87] PCT Pub. No.: WO88/04447
PCT Pub. Date: Jun. 16, 1988

[30] Foreign Application Priority Data

Dec. 10, 1986 [DE] Fed. Rep. of Germany ....... 3642113

[51] Int. Cl.$^5$ .................... F16K 37/00; F16K 31/05
[52] U.S. Cl. ................. 137/551; 251/129.04; 251/129.12

[58] Field of Search .................. 137/551; 251/129.12, 251/129.04

[56] References Cited

U.S. PATENT DOCUMENTS

| 2,943,706 | 7/1960 | Morgan | 251/129.12 X |
| 2,977,437 | 3/1961 | Doane | 251/129.12 X |
| 3,680,831 | 8/1972 | Fujiwara | 251/129.12 |
| 4,000,663 | 1/1977 | Tyler | 251/129.12 X |
| 4,647,007 | 3/1987 | Bajka | 251/129.12 X |

Primary Examiner—John Rivell
Attorney, Agent, or Firm—Robert B. Leonard

[57] ABSTRACT

A control device for a radiator valve comprises a housing (10, 12) including an operating, display, control and power supply portion, (14, 16, 18). Said housing comprises a cut-out (24) with which it is slipped-over a motorized drive unit (30–84). When the housing (10, 12) is removed from the drive unit, a reception housing (38) for a motor (34) and a gear unit (36) can be rotated as a hand wheel with respect to a stationary drive housing (32) flanged to the radiator valve so that the valve may be manually operated. A ring (66) being rotatable with respect to the reception housing (38) and a drive housing (32) allows balancing of tolerances and matching to radiator valves of different manufacturers.

13 Claims, 6 Drawing Sheets

CONTROL DEVICE FOR A RADIATOR VALVE

The present invention relates to a control device for a radiator valve according to the preamble of claim 1.

From DE-C 28 00 704 it is for instance known to control a raidator valve via a motor and a gear unit, where at an electrical circuit compares the set value and the measured value of a temperature and provides according control commands to the motor as a function of the control deviation. Furthermore, there each position reached by the final control element is reported back by a position indicator to the electrical circuit.

Furthermore, it is already known from DE-A 32 10 585 to provide such a control device with a keyboard and a display in order to implement a control according to an adjustable time program.

Design features of such control devices for radiator valves may be taken from DE-A 34 01 154 or from DE-A 35 15 590, respectively. There the control portion and the driving portion are preferably separated in space, and actuating means are provided accessible from the outside in order to manually operate the valve at a breakdown of the control. In order to match the control device to the valves of different manufacturers a bushing within the driving chain has to be exchanged.

Departing from those known control devices for radiator valves, it is the object of the present invention to design such a device still more compact and user friendly. This object is achieved according to the characterizing features of claim 1. Further advantageous embodiments of the inventive control device may be taken from the subclaims.

The control device according to the invention in particular allows a manual operation of the radiator valve according to a common hand wheel operation after the main housing has been removed from the motorized drive unit. Furthermore, by a relative rotation of an adaptor and tolerance ring with respect to the motor which is arranged in the gear train, a nearly continuous matching to the valves of different manufacturers is possible. If the motorized drive unit is locked to the main housing by means of a mounting lever, then an apron at the main housing overlapping a cap screw or another fixing element prevents unscrewing of the control device from the radiator valve and at the same time battery cells inserted into the main housing from the backside cannot be removed.

Figure 2:
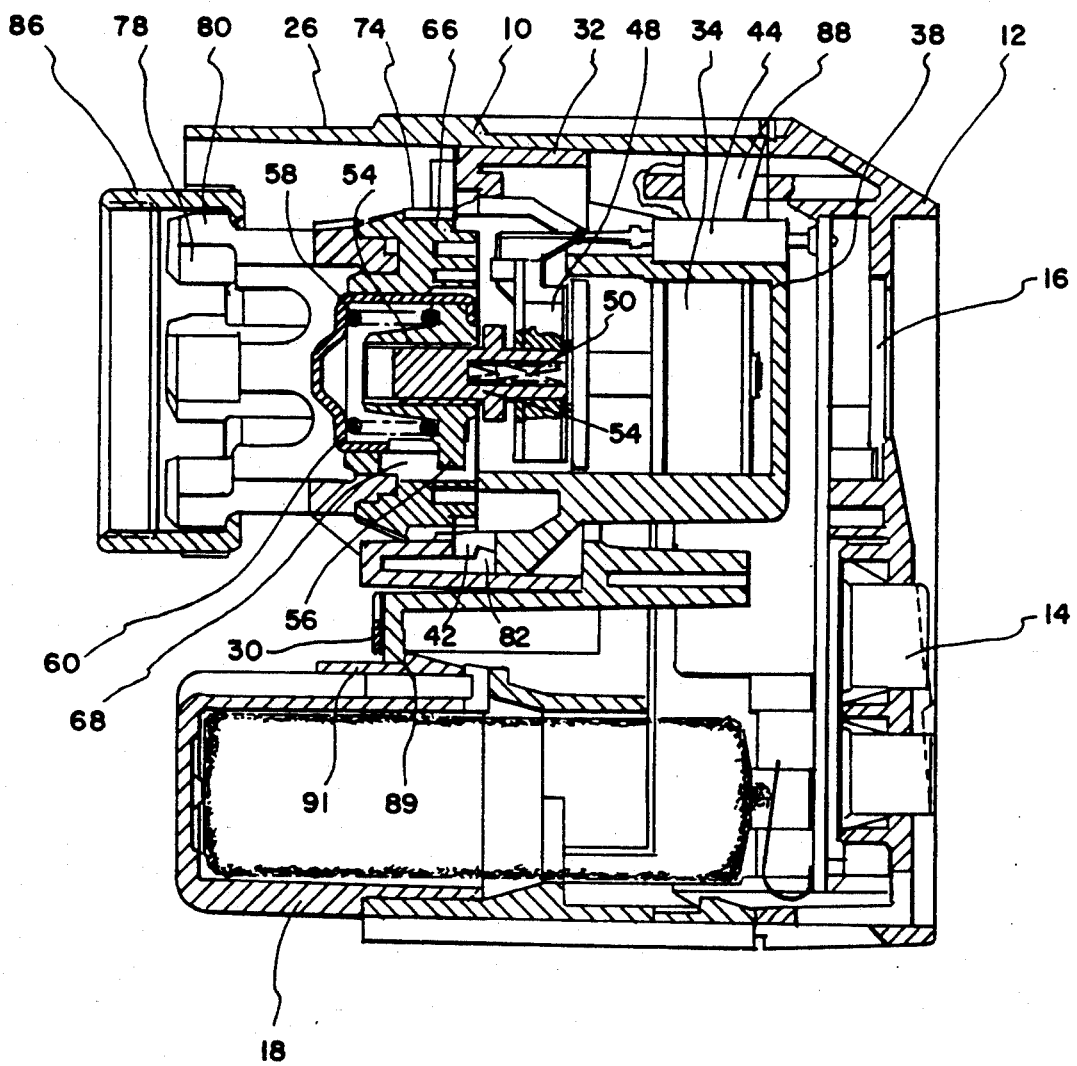
Figure 3:
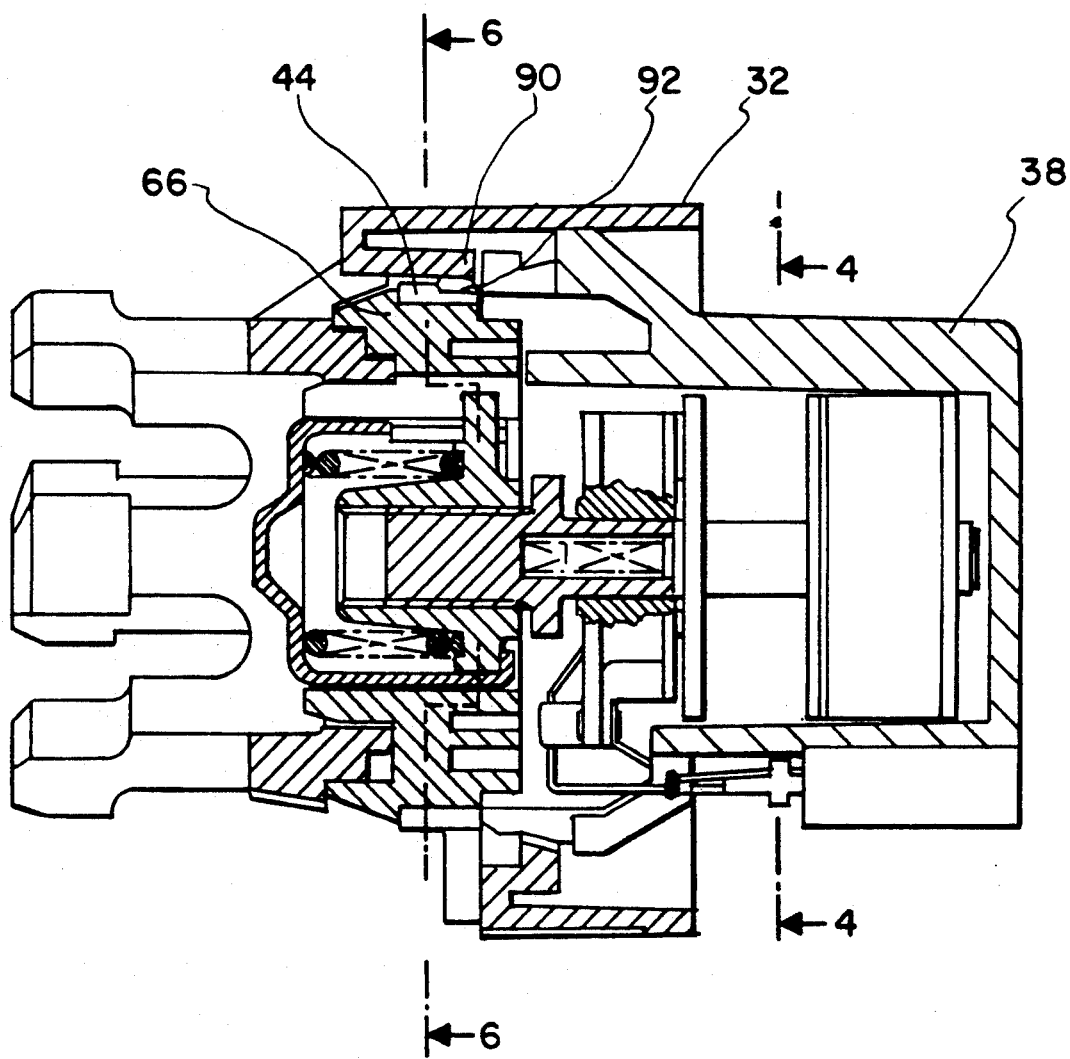
Figure 4:
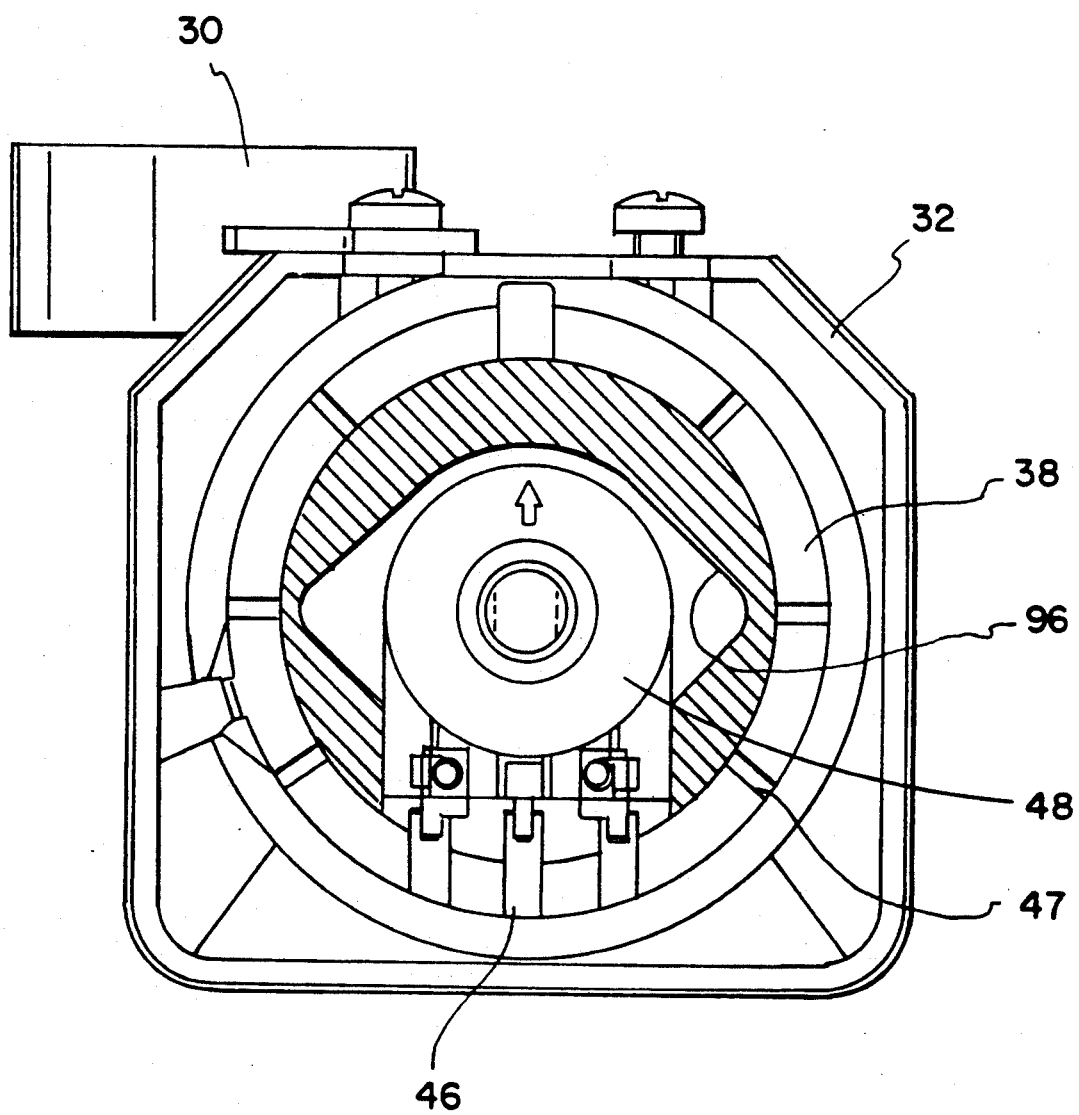
Figure 5:
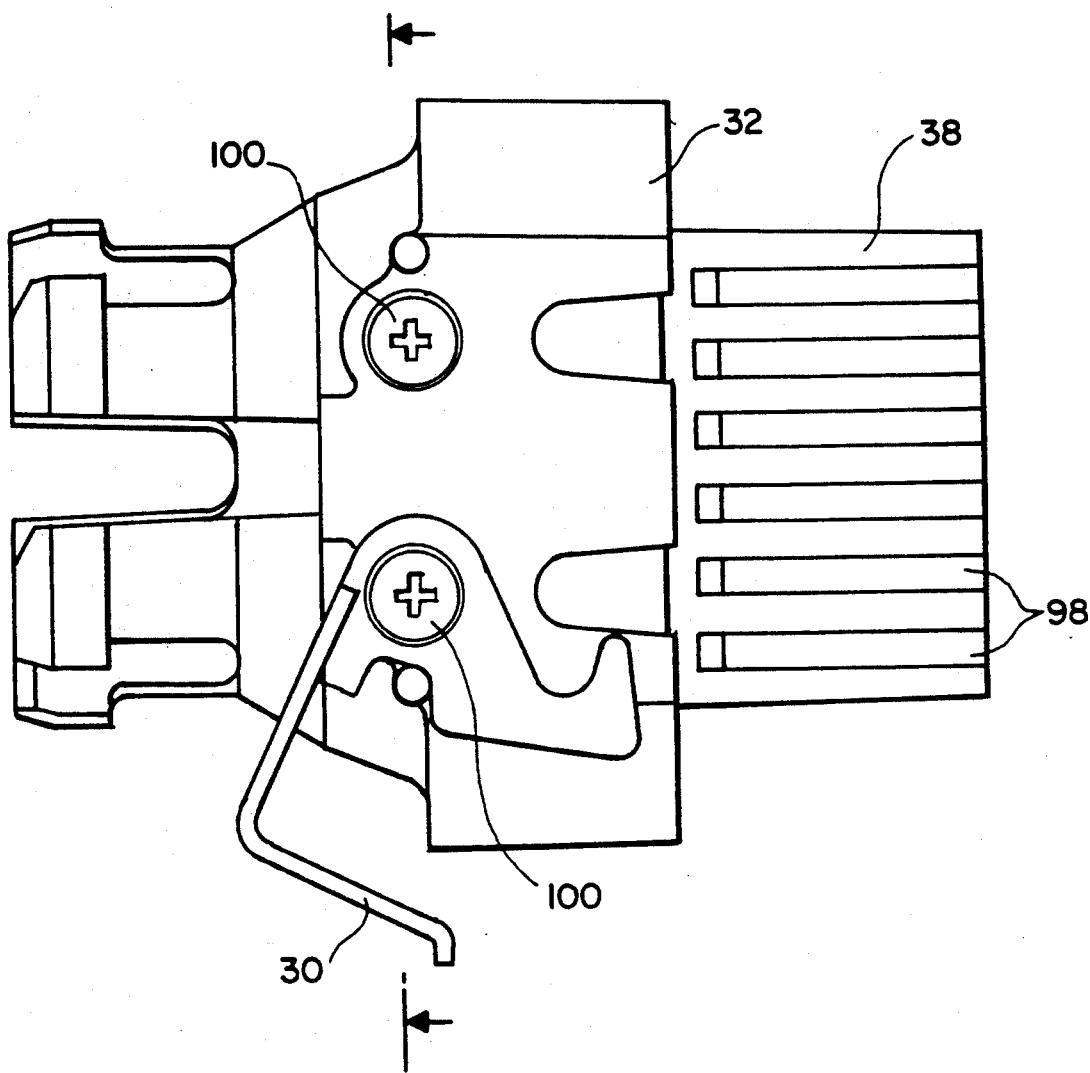

With respect to an embodiment shown in the figures of the attached drawing the invention shall be further explained in the following. It shows:

FIG. 1 a control device according to the present invention in an exploded view;

FIG. 2 a sectional view of the control device according to the invention in an assembled state;

FIG. 3 an axial section through the motorized drive unit;

FIG. 4 a view along the line of intersection IV—IV in FIG. 3;

FIG. 5 the unit according to FIG. 4 in a view from below; and

Figure 6:
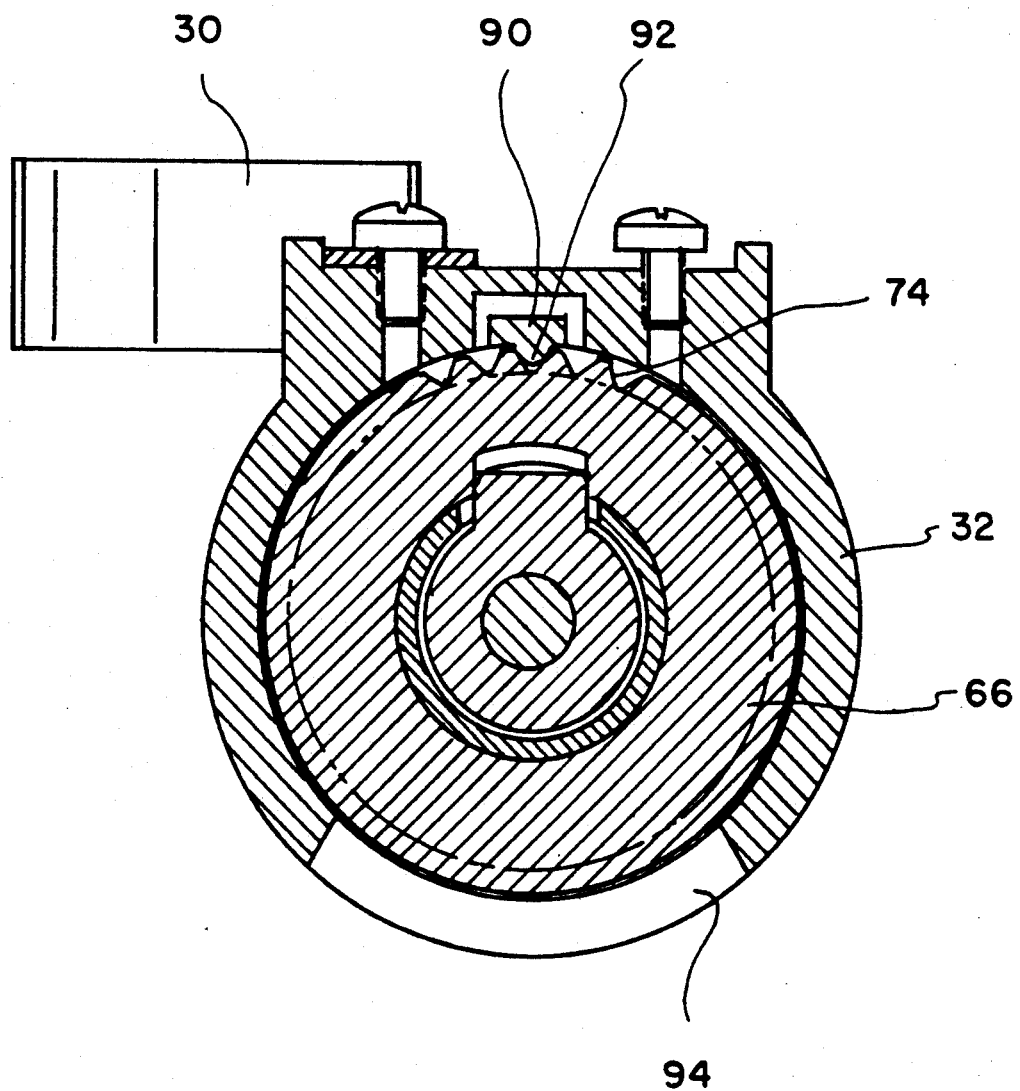

FIG. 6 a view along the line of intersection VI—VI in FIG. 3.

According to FIG. 1 a control housing 12 may be slipped-on to a main housing 10. The control housing 12 comprises operating elements as for instance a keyboard 14 and a LCD display 16. The keyboard 14 for instance serves to input a weekly program, i.e. a lowering or lifting of a temperature, respectively, at certain points of time or at certain days within the week. The display 16 serves to instruct the operating personnel and to select a modus by means of a menu as well as to display the adjusted daily program. The control housing 12 includes at its backside a not shown printed circuit board with a microprocessor and related elements in order to allow implementing of the according functions. A battery housing 18 is inserted into the main housing 10 from the rearside and in the lower portion. Feeding of the battery voltage to a printed circuit board within control housing 12 is done by contact connectors 20 and contact connectors on the printed circuit board itself when the main housing 10 is assembled with the control housing 12. The main housing 10 comprises an intermediate wall 22 having a U-shaped cut-out 24 which is engaged by a motorized drive unit still to be described. On the level of the U-shaped cut-out 24 the main housing 10 comprises a rearwardly extending apron 26. At a depression 28 at the main housing 10 a mounting lever 30 abuts if it locks a stationary drive housing 32 to the main housing 10.

The motorized drive unit comprises a DC motor 34 with a gear unit 36, both of which are inserted in an accordingly shaped cut-out of a housing 38. The housing 38 comprises in its rearward portion a U-shaped cross-section which is matched to the cut-out 24 in the main housing 10, with that cross-section changing over conically into a round flange 42. Slots 47 within the flange 42 allow a deformation of said flange. On the flat portion of the U-shaped housing portion 40 a lug board is arranged, the pins of which are connected via openings 46 to the terminals of the motor 34 and to a potentiometer 48 for feeding back the measured position with said potentiometer 48 being connected to a shaft 50 of the motor.

The motor shaft 50 is slipped-on to a threaded spindle 52 which on its behalf engages a nut 54. The nut 54 is provided with a radially extending pin 56 and its abuts via an overload spring 58 against an overload cup 60. After inserting the nut 54 and the overload spring 58 into the overload cup 60, flange pins 62 at the overload cup 60 are bent inwardly so that the recited elements are connected with each other and form one unit.

This unit is inserted in an according bore 64 of an adaptor and tolerance ring 66, whereat the bore 64 is provided with a groove 68 parallel to its axis with the pin 56 engaging said groove via an according cut-out 70 within the overload cup 60. The adaptor and tolerance ring 66 is provided at a ring-shaped portion 72 with a knurling 74 and is provided with a scale, and it comprises a rearwardly extending tube-shaped extension 76. This extension 74 engages an according bore 84 within the drive housing 32.

The drive housing 32 comprises a connecting stud 80 which is provided with longitudinal slots 78 parallel to its axis and which may be connected by means of a cap screw 86 with a not shown radiator valve. Furthermore, the drive housing 32 is provided with webs 82 which are arranged concentrically to the bore 84 and which are engaged by the ring-shaped flange 42 of the reception housing 38 in order to connect all elements of the drive unit with each other.

FIG. 2 shows the control device in its assembled state, whereat a man skilled in the art recognizes how the elements which are disassembled according to FIG. 1 and are provided with the same reference numbers in FIG. 2 are assembled. One recognizes that the control housing 12 is locked to the main housing 10 by means of a latch 88 and that the reception housing 38 for the motor 34 and for the gear unit engages with its ring-shaped flange 42 the webs 82 of the drive housing 32. The adaptor and tolerance ring 66 is hereby axially secured within the drive housing 32. Furthermore, the battery housing 18 is inserted in the main housing 10 and is locked to the main housing by means of a latch 89 at a resilient housing portion 91. The mounting lever 30 secures the drive housing 32 within the main housing 10, and the apron 26 overlaps to a large extent the cap screw 86 when the main housing 10 is slipped on the motorized drive unit.

Altogether set movements of the nut 54 or the overload cup 60, respectively, are now possible in the following way:

Firstly, an axial set movement of the nut 54 or the overload cup 60, respectively, may be achieved by means of the motor 34, the gear unit 36, the motor shaft 50 and the threaded spindle 52 since the nut 54 is secured within the adaptor and tolerance ring 66 against rotation, and the adaptor and tolerance ring 66 on its behalf is secured against rotation in a manner still to be described. Secondly, when the main housing 10 and the control housing 12 are removed, the reception housing 38 for the motor 34 can be manually rotated so that a normal hand setting of the valve is possible. Thirdly, when the main housing 10 and the control housing 12 are also removed, the adaptor and tolerance ring 66 can be rotated via the accessible knurling 74, which results in an axial set movement of the overload cup 60 acting upon the not shown valve stem.

FIG. 3 shows the motorized drive unit in its assembled state, wherat only the important portions are provided with reference numbers. From this figure and from the sectional view according to FIG. 6 it may be taken that the drive housing 32 comprises a cut-out 94, by means of which the knurling 74 is accessible in order to manually adjust the adaptor and tolerance ring 66, whereat a latch 92 at a resilient portion 90 of the drive housing 32 counteracts to this setting and prevents at a motorized or a manual setting, respectively, of the total unit a relative rotation between the adaptor and tolerance ring 66 and the drive housing 32.

From FIG. 4 it may be taken that the reception housing 38 comprises a cut-out 98 which is matched to the shape and dimension of the motor or gear unit, respectively, in order to mount and to secure against rotation those drive units within the reception housing 38.

From FIG. 5 it may be taken that the reception housing 38 is provided at its U-circumference with indentations 98 to make rotatable the reception housing 38 at its manual setting in the same manner as a handle. The mounting lever 30 is supported by means of a screw 100 at the drive housing 32 and if required can be positioned in the other position as provided by the screw 100'.

We claim:
1. A control device for a radiator valve, comprising:
a motorized drive unit which can be flange mounted to the radiator valve and having a rotatable portion; and
a main housing connectable to said motorized drive unit, said main housing having operating, display, control and power supply portions, and a cut-out, said cut-out being shaped to accept said rotatable portion therein, said rotatable portion being prevented from rotation when within said cut-out.
2. The device according to claim 1, wherein:
said rotatable portion is provided by a reception housing (38) which accommodates a motor (34) with a gear unit (36).
3. The device according to claim 2, wherein:
said driving shaft (50) is drivingly connected via a position indicator (48) to a threaded spindle (52), wherein said threaded spindle (52) engages a nut (54) which is secured against rotation in an adaptor and tolerance ring (66).
4. The device according to claim 3, wherein:
said nut (54) abuts via an overload spring (58) against a cup-shaped bushing (60).
5. The device according to claim 4, wherein:
said nut (54) comprises a radially extending pin (56) which engages a groove (68) in the adaptor and tolerance ring (66) via a groove (70) in the cup-shaped bushing (60).
6. The device according to claim 3, wherein:
said adaptor and tolerance ring (66) have a circumference and are rotatably supported in a drive housing (32) for flange-mounting to the radiator valve, said adaptor and tolerance ring (66) having a knurling (74) at the circumference of the adaptor and tolerance ring (66) which acts together with a resilient latch (92) at the drive housing (32).
7. The device according to claim 6, further comprising:
a mounting lever (30) supported at said drive housing (32) serving to lock said main housing (10) to the motorized drive unit (30-84) in its slipped-on state.
8. The device according to claim 7, further comprising:
a plug board (44) on said reception housing (38) for electrically connecting said motorized drive unit to said operating portion.
9. The device according to one of claims 1 and 2 to 8, further comprising:
batteries in a power supply portion, said power supply portion is a battery plug-in unit (18) which insertable from the backside of said main housing (10).
10. The device according to claim 9, wherein:
said battery plug-in unit (18) extends parallel to said motorized drive unit (30-84).
11. The device according to claim 1, wherein:
said main housing (10) comprises an apron (26) which overlaps a flange connection (80, 86) between said motorized drive unit and the radiator valve.
12. The device according to claim 1, wherein:
said control, operation and display portion is included in an operating housing (12) which may be slipped-on said main housing (10) and locked to it via latches (84).
13. The device according to claim 7, wherein:
said mounting lever (30) may be mounted in two positions (100, 100') at said drive housing (32) with said two positions being symmetrically arranged with respect to said longitudinal axis.

* * * * *